Jan. 23, 1934.  W. T. CLARK  1,944,152
SHIELD FOR VEHICLE WINDOWS
Filed Sept. 18, 1930  2 Sheets-Sheet 1
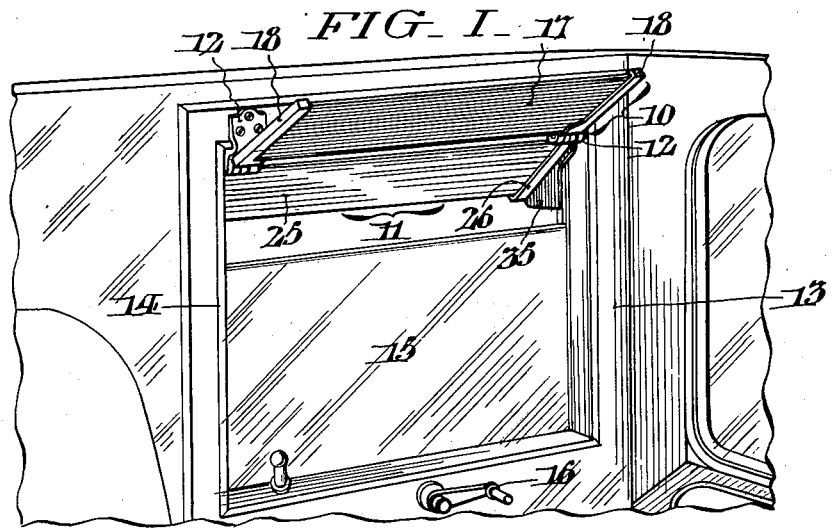
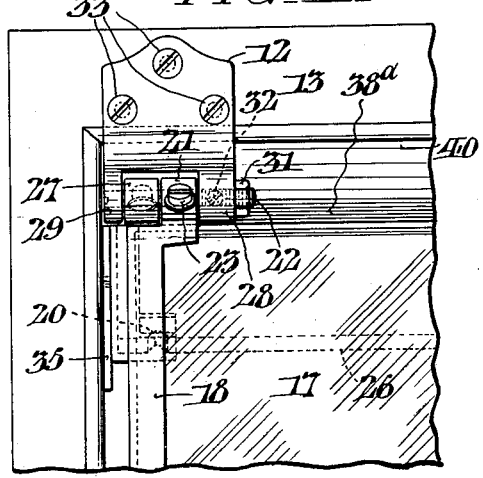
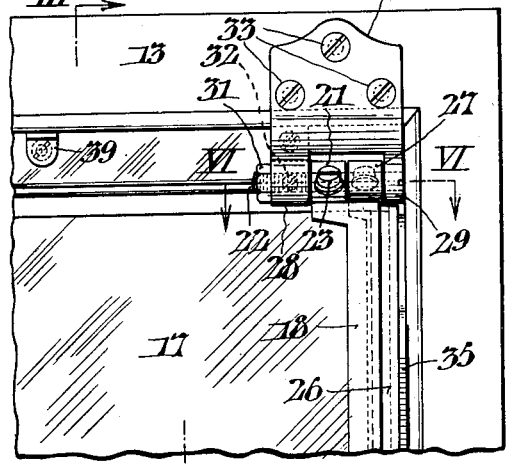
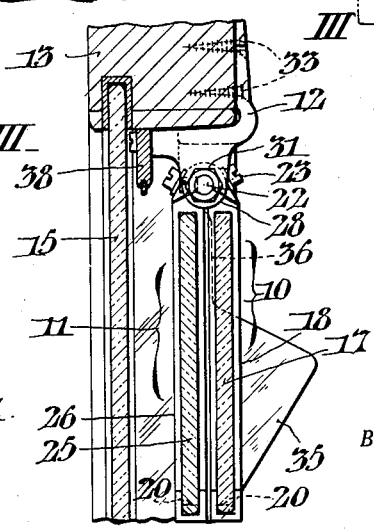
WITNESSES
Thomas W. Kerr, Jr.
Hubert Fuchs
INVENTOR:
William T. Clark,
BY Fraley & Paul
ATTORNEYS.

Jan. 23, 1934.  W. T. CLARK  1,944,152
SHIELD FOR VEHICLE WINDOWS
Filed Sept. 18, 1930  2 Sheets-Sheet 2
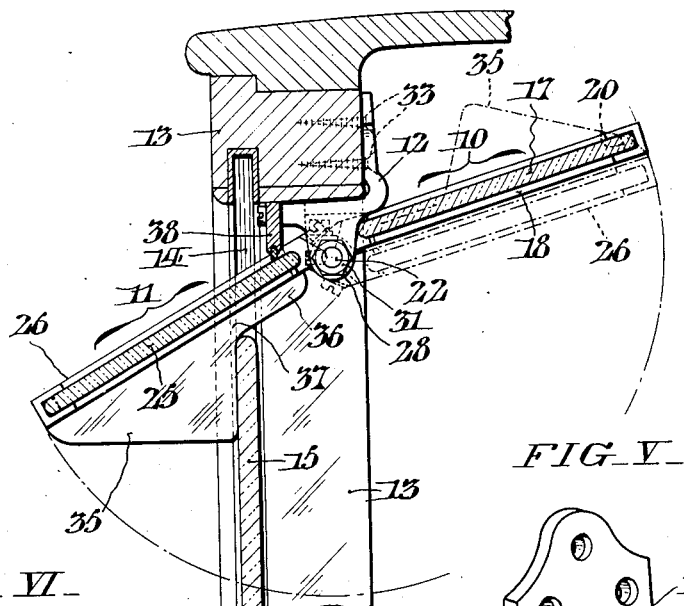
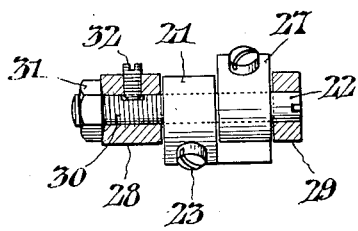
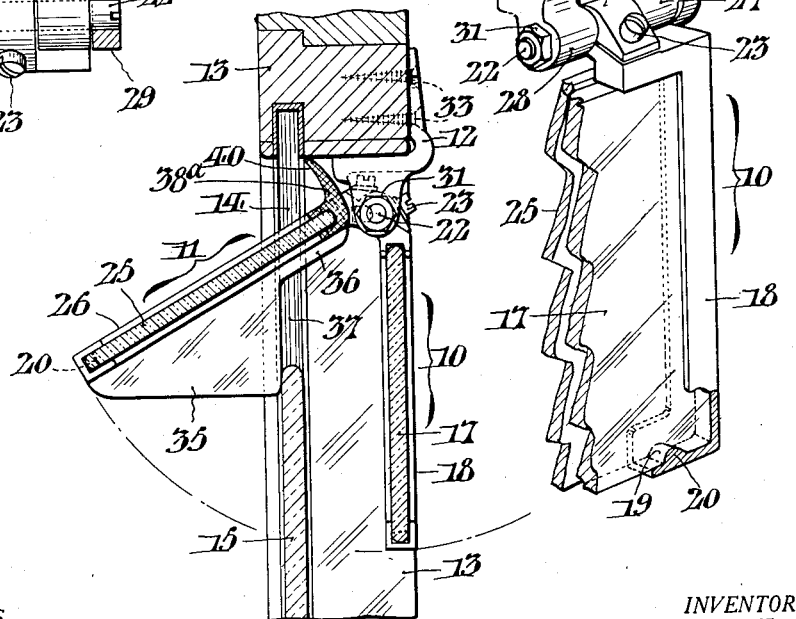
WITNESSES
Thomas W. Kerr, Jr.
Hubert Tuchs
INVENTOR:
William T. Clark,
BY Fraley Paul
ATTORNEYS.

Patented Jan. 23, 1934

1,944,152

UNITED STATES PATENT OFFICE 1,944,152

SHIELD FOR VEHICLE WINDOWS

William T. Clark, Philadelphia, Pa.

Application September 18, 1930
Serial No. 482,675

5 Claims. (Cl. 296—44)

This invention relates to shield means intended for use in association with vertically sliding glass windows of automobiles and the like.

More particularly, my invention has reference to combined sun and rain shields of the type disclosed in a co-pending application, Serial No. 386,768, filed by me on August 19, 1929. The organization featured in the identified application embodies a sun shield wing of colored or translucent glass and a rain shield wing of transparent plate glass, the two wings being independently pivoted on a common axis inside the top of the window so as to be swingable from a normally retracted position within the vehicle into operative or projected position in relation to the sliding glass sash. With the aforesaid rain shield wing is associated a cam means which, by co-operation with the sliding glass sash incident to adjustment of the latter, causes said rain shield wing to be moved, with provision of a regulatable vent between said wing and the sliding sash. Provisions are also made in the above referred to application for releasably holding the two wings retracted within the vehicle body when not needed.

My present invention is directed in part toward structural refinements in connection with sun and rain shield means of the kind indicated whereby assembling of their component parts, and application of them to vehicle windows of different sizes is greatly facilitated.

Another object of my invention is to provide improved means for yieldingly holding the shield wings against displacement in the inactive or retracted position as well as in different positions to which they may be shifted incident to use.

Still further objects and attendant advantages of this invention will be manifest from the following detailed description of the attached drawings, wherein Fig. I is a fragmentary perspective view of the inside of the frontal portion of an automobile body showing one of the door windows fitted with my improved shield means.

Fig. II is a fragmentary view of an upper corner of the door window, drawn to a somewhat larger scale, and showing the parts of the shield means in greater detail.

Fig. III is a sectional view, taken as indicated by the arrows III—III in Fig. II, showing the sliding sash glass of the door window closed and the sun shield wing down in operative position.

Fig. IV is a view, corresponding to Fig. III, showing the rain shield wing projected and the sun shield wing retracted.

Fig. V is a fragmentary perspective view showing the sun and rain shield wings and one of the pivot brackets by which they are attached to the automobile door.

Fig. VI is a detail sectional view taken as indicated by the arrows VI—VI in Fig. II.

Fig. VII is a fragmentary view, corresponding to Fig. II, showing a slight modification of my invention; and, Fig. VIII is a vertical sectional view of the organization depicted in Fig. VII.

As in the previous application above referred to, my present invention includes a sun shield wing 10 and a rain shield wing 11 which, as shown in Figs. I-V, are pivotally attached by means of a pair of brackets 12 to the top of the door 13 of the automobile so as to be swingable inward and outward through the window opening 14 of the door when the sash glass 15 is lowered by manipulation of the usual hand crank 16. The sun shield wing 10 comprises a colored or translucent plate of glass or the like 17 whereof the opposite end edges and contiguous corner portions are cemented into the channel hollows of angularly-contoured supporting hangers 18. For greater security I provide the lower edge of the glass 17 adjacent each end with a notch 19 to engage a lug 20 extending transversely of the hollow in the bottom horizontal projection of the corresponding hanger 18, as shown in Fig. V. At their tops the hangers 18 have integrally formed split bosses 21 for respectively engaging hinge pintles 22 fixed against rotation in the brackets 12 as hereinafter more fully explained. By means of screws 23, the frictional engagement of the bosses 21 with the stationary pintles 22 may be regulated to yieldingly hold the wing 10 in any position to which it may be swung. The rain shield wing 11, on the other hand, embodies a clear glass plate 25 to the ends of which are secured hangers 26 whereof the construction is identical with that of the hangers 18 of the sun shield wing 10 and provided at their tops with screw regulatable split bosses 27 to similarly engage the stationary pintles 22 of the brackets 12 respectively. From Fig. II it will be particularly noted that each pair of corresponding bosses 21, 27 of the shields 10, 11 is snugly accommodated in an interval between the pintle supporting lugs 28, 29 of the brackets 12. In each instance, one end of the pintle 22 is free in the boss 29, while the other end is in threaded engagement with the boss 28, as conventionally indicated at 30 in Figs. II and VI, and fitted with a nut 31 which is adapted to jamb against the outside face of said lug for the purpose of preventing rotation of the pintle 22. For further assurance against the possibility of the latter contingency, I provide the boss 28 with a set screw 32 to bind against the pintle 22 at one side. As shown to the best advantage in Figs. I, III and IV, the brackets 12 are made to substantially right angled configuration so as to bear against both the inside and bottom faces of the top rail of the door 13 adjacent the top corners with the pintles 22 constituting the fulcrum axes for the wings 10, 11 lying within the window opening 14. Screws 33 are shown as a convenient means in the present instance for fastening the pivot brackets 12 to the door 13.

Secured to or forming a part of the forward hanger 26 of the rain shield wing 11 is a baffle 35 of triangular configuration, which, when said wing is fully extended, as shown in Fig. IV, operates, incident to forward travel of the vehicle to deflect wind as well as rain while permitting ventilation over the top of the sash glass 15. The baffle 35, by cooperation with the upper edge of the sash glass 15, also functions as a cam whereby the wing 11 is gradually moved, to the position of Fig. IV, incident to raising of said sash glass. It is noteworthy here that an extension 36 of the baffle prevents complete closing of the sash glass 15 with consequent determination of a minimum opening for ventilation at 37.

To prevent entry of rain over the top of the wing 11 when projected, as in Fig. IV, I provide a rubber-edged sealing strip 38 which extends across the top of the window opening 14. As shown in Figs. I-IV, the weathering strip 38 is fixedly supported jointly by the pivot brackets 12, and one or more angle lugs 39 secured to the top rail of the door 13 at suitable intervals intermediate said brackets.

Ordinarily, the wings 10, 11 are swung up out of the way within the vehicle body to the positions respectively indicated in full and dot-and-dash lines in Fig. IV. When the rays of the sun are to be intercepted with the window completely closed, both wings 10, 11 are simply swung down parallel with the sash glass 15 as shown in Fig. III. In rainy weather, the sun shield wing 10 is kept retracted, and the rain shield wing 11 swung out through the window opening 14 over the top edge of the sash glass 15 previously lowered. Then, by cam action of the baffle 35 with the glass 15, the wing 11 is gradually swung upward as the said glass is raised. With advance of the top edge of the sash glass 15 past the corner of the baffle 35, the shield glass 26 is brought into pressure contact with the sealing strip 38. Further raising of the sash glass 15 thereafter will be attended by gradual decrease in the opening for ventilation until the minimum clearance 37 is attained as determined by the extension 36 of the baffle 35. Variable ventilation may thus be had to the exclusion of rain. In instances where rain is accompanied by high wind velocity, the sun shield wing 10 may be swung down as in Fig. VIII for service as a baffle to prevent direct draft.

In the modification of Figs. VII and VIII, the sealing means has the form of a molded strip 38a of rubber. From Fig. VIII it will be noted that this strip 38a is grooved to engage over the upper edge of the glass plate 25 of the rain shield wing 11a and that it affords a flexible tongue 40 which seals weather tight against the lower face of the top rail of the door 13 when the said wing 11 is fully projected. In all other respects, the modification is identical with the first described embodiment of my invention featured in Figs. I-VI, all corresponding parts having been identified with the same reference numerals previously used to preclude the necessity for repetitive description.

The use of individual brackets 12, as herein featured, to support the wings 10, 11 greatly facilitates fitment and application of my improved shield means to the vehicle windows. The adaptation of the shield means to windows of different sizes is obviously a simple matter in view of the novel features of construction hereinbefore disclosed since it entails only cutting of the shield glasses 17 and 25 to the proper length. It is furthermore obvious that the shield means of my invention may be made of single wings for protection against either rain or sun as may be desired; or again it may be utilized in the single form as an auxiliary shield means in connection with the frontal "wind" shield of an automobile to protect the driver against headlight glare incident to night driving.

Having thus described my invention, I claim:

1. The combination with the sliding sash glass of a window and shield means including a wing, of a pivot mounting for supporting the wing inside the top of the window with capacity for projection outward through the window opening, said pivot mounting including a bracket secured to the window frame, and a hanger with an adjustable split bearing boss to frictionally engage a non-rotative pintle in the bracket whereby the wing is yieldingly held against displacement in different positions of adjustment.

2. The combination with the vertically sliding sash glass of a window and shield means including a wing plate, of a pivotal mounting for supporting the wing plate inside the top of the window with capacity for projection outward through the window opening, said pivot mounting comprising a pair of brackets secured to the window frame, and hangers engaging the plate of the shield wing at opposite ends, said hangers being formed with adjustable split bosses to engage non-rotative pintles in the brackets whereby the shield wing is held against displacement in different positions of adjustment.

3. The combination with the vertically sliding sash glass of a vehicle window and shield means including a wing plate, of a pivot mounting for supporting the wing plate inside the top of the window with capacity for projection through the window opening, said wing plate having at one end, a rain baffle of cam configuration adapted to cooperate with the sliding sash glass incident to movement of the latter in causing the wing to be automatically swung to different positions, and the pivot mounting aforesaid embodying friction means to yieldingly resist movement of the wing by the sash glass.

4. The combination with the sliding sash glass of a vehicle window having shield means including a translucent sun shield wing plate and a transparent rain shield wing plate, of pivot mountings inside the top of the window affording the shield wing plates support with capacity for projection through the window opening, said pivot mountings comprising brackets secured to the frame of the window, and associated hangers respectively engaging the ends of the shield wing plates formed with split bosses to engage non-rotative pintles in the brackets, whereby the two wing plates are yieldingly held against displacement independently in different positions of adjustment.

5. A pivot mounting for supporting sun and rain shield wings inside the top of a vehicle window with capacity for being swung down from a normally retracted position into operative relation to the window, said mounting including a pair of brackets secured to the window frame, each said bracket embodying spaced apertured-lugs one of which is screw threaded to receive the correspondingly threaded end of a pintle element, means whereby the respective pintles are securely locked against rotation, and hangers engaging the shield wings at opposite ends, said hangers being formed with adjustable split bosses to engage the non-rotative pintles of the brackets, whereby the shield wings are held against displacement in different positions of adjustment.

WILLIAM T. CLARK.